(12) United States Patent
Sandberg et al.

(10) Patent No.: US 10,432,352 B2
(45) Date of Patent: Oct. 1, 2019

(54) FAST INITIALIZATION OF DOWNLINK ADAPTATION

(71) Applicant: Telefonaktiebolaget LM Ericsson (publ), Stockholm (SE)

(72) Inventors: David Sandberg, Solna (SE); Patrik Rask, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/570,886

(22) PCT Filed: Jun. 3, 2015

(86) PCT No.: PCT/SE2015/050642
§ 371 (c)(1),
(2) Date: Oct. 31, 2017

(87) PCT Pub. No.: WO2016/195554
PCT Pub. Date: Dec. 8, 2016

(65) Prior Publication Data
US 2018/0294918 A1    Oct. 11, 2018

(51) Int. Cl.
*G01R 31/08* (2006.01)
*H04L 1/00* (2006.01)
*H04B 17/336* (2015.01)
*H04W 24/08* (2009.01)

(52) U.S. Cl.
CPC ......... *H04L 1/0019* (2013.01); *H04B 17/336* (2015.01); *H04L 1/001* (2013.01); *H04L 1/0004* (2013.01); *H04L 1/0026* (2013.01); *H04L 1/0034* (2013.01); *H04W 24/08* (2013.01)

(58) Field of Classification Search
USPC .......................................... 370/230, 252, 328
See application file for complete search history.

(56) References Cited

U.S. PATENT DOCUMENTS

2018/0294918 A1 * 10/2018 Sandberg .............. H04L 1/0004

OTHER PUBLICATIONS

International Search Report and Written Opinion of the International Searching Authority, PCT/SE2015/050642, dated Feb. 3, 2016, 13 pages.
"Dynamic Control of CQI Reporting," XP050132028, BenQ Mobile, 3GPP TSG RAN WG2 #54, R2-062448, Aug. 28-Sep. 1, 2006, Tallinn, Estonia, 5 pages.

(Continued)

*Primary Examiner* — Phuongchau Ba Nguyen
(74) *Attorney, Agent, or Firm* — Patent Portfolio Builders, PLLC (57) ABSTRACT

In a method for downlink link adaptation in a network node in a communication system, the network node serving a cell and active user equipment within the cell, performing the steps of obtaining uplink path gain and downlink SINR for at least a subset of active user equipment in the cell, estimating an initial downlink SINR for new user equipment in the cell, based on an estimated uplink path gain together with a determined statistical measure for the obtained uplink path gain and downlink SINR for the at least a subset of active user equipment in the cell, and utilizing the estimated initial downlink SINR for downlink link adaptation for a subsequent transmission to the new user equipment.

10 Claims, 6 Drawing Sheets

(56) References Cited

OTHER PUBLICATIONS

Guillaud, M., et al., "A Practical Method for Wireless Channel Reciprocity Exploitation Through Relative Calibration," XP010885465, Proceedings of the $8^{th}$ International Symposium on Signal Processing and its Applications, Aug. 28-31, 2005, Sydney, Australia, vol. 1, pp. 403-406.

Cai, Yi, et al., "Reduced Feedback Schemes for LTE MBMS," XP031474776, IEEE, $69^{th}$ Vehicular Technology Conference, Apr. 26-29, 2009, Barcelona, Spain, pp. 1-5.

\* cited by examiner

FAST INITIALIZATION OF DOWNLINK ADAPTATION

CROSS REFERENCE TO RELATED APPLICATIONS

This application is a 35 U.S.C. § 371 national stage application of PCT International Application No. PCT/SE2015/050642 filed on Jun. 3, 2015, the disclosure and content of which is incorporated by reference herein in its entirety.

TECHNICAL FIELD

The proposed technology generally relates to initial downlink channel quality estimation in communication systems, and in particular to improvement of initial downlink channel quality estimation which enables a faster initialization of downlink link adaptation.

BACKGROUND

In a layered protocol stack of a communication network the physical layer is responsible for coding, physical-layer hybrid-ARQ processing, modulation, multi-antenna processing, and mapping of the signal to the appropriate physical time-frequency resources. It also handles mapping of transport channels to physical channels. Within LTE (Long Time Evolution) the physical Downlink Control Channel (PDCCH) is used for downlink control information, mainly scheduling decisions, required for reception of PDSCH (Physical Downlink Shared Channel) and for scheduling grants enabling transmission on the PUSCH (Physical Uplink Shared CHannel). In particular, the PDCCH in LTE carries uplink grants and downlink assignments to the user equipment (UE) with relation to a particular eNodeB. The uplink grants allow a UE to transmit in the uplink (to the eNodeB) and a downlink assignment tells the UE that a downlink transmission is sent (from the eNodeB). Both the uplink grants and the downlink assignments are defined only for one Transmission Time Interval (TTI) e.g. 1 ms. For continuous transmission a new grant/assignment has to be sent every TTI. One exception to this is so called semi-persistent scheduling (SRS), where scheduling can be done for several TTI with one assignment or grant, specifying that the allocation is valid every x ms until it is inactivated by a new assignment or grant.

Typically the PDCCH is transmitted with so called QPSK (Quadrature Phase-Shift Keying) modulation and coding alternatives are available by allocating 1, 2, 4 or 8 Control Channel Elements (CCE:s) to each assignment/grant in PDCCH. The total number of CCE:s is limited and depends on the system bandwidth. If no link adaptation is made on PDCCH, 8 CCE:s must be allocated for all users to assure communication for cell edge users that experience bad channel quality.

Link adaptation for PDSCH is typically performed based on channel state information (CSI) which is reported from the UE. The CSI includes channel quality indicators (CQI:s) which guide the modulation and coding scheme (MCS) selection in the base station. Similarly, the number of CCEs to use on PDCCH could be based on the CQI reports, with a fixed offset value M to handle the mismatch between the channel that CQI meant to represent and the channel that PDCCH uses.

Figure 1:
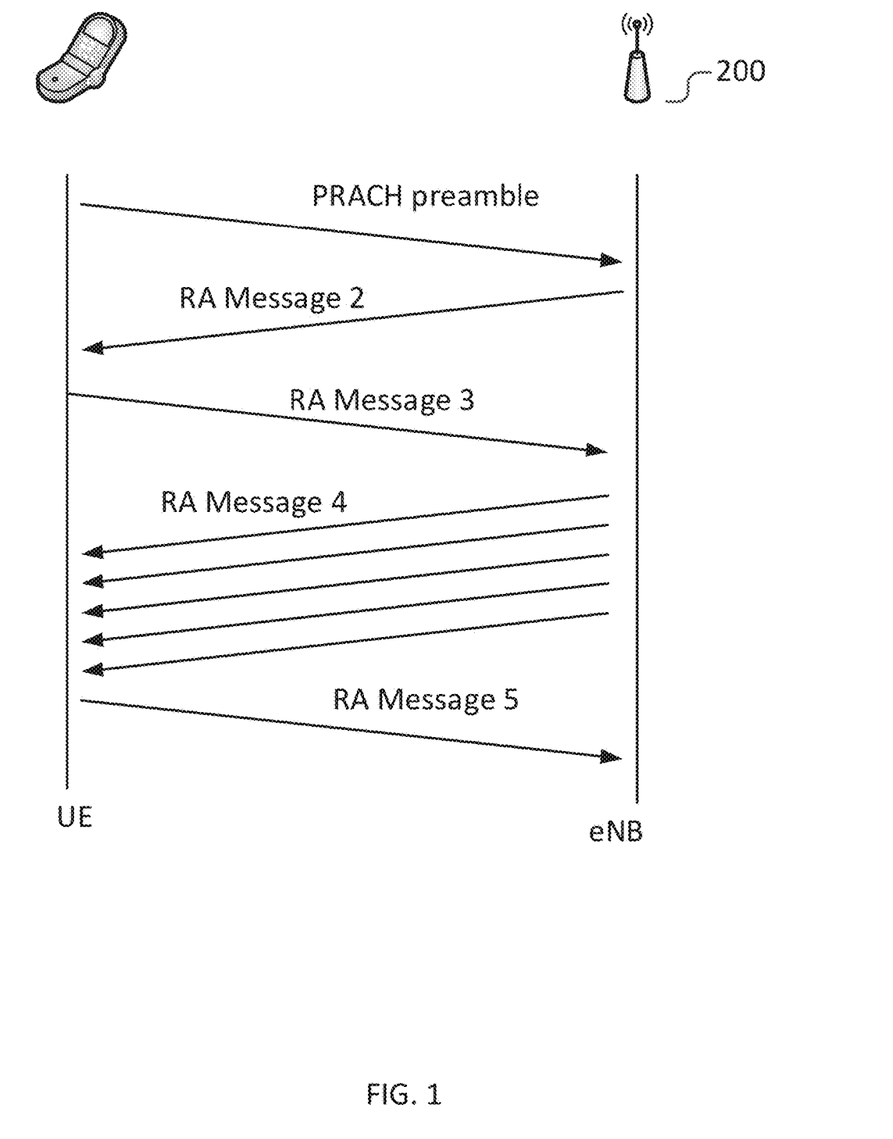
FIG. 1 is a signaling scheme in which the current disclosure can be implemented.

In FIG. 1 a typical signaling scheme for UE initiated UE setup is shown. The UE starts by transmitting a preamble on the Physical Random Access Channel (PRACH). The network node e.g. eNodeB responds to this with a Random Access (RA) Message 2 in which the UE also receives a grant for RA Message 3. In RA Message 3 the eNodeB receives the C-RNTI (Cell Radio-Network Temporary Identifier) which identifies the UE on a cell level. The eNodeB then knows that the UE is new in the cell and that an RRC connection Setup Request is needed to setup the UE. In the initial UE setup procedure this message is sent in RA Message 4, and the UE responds to this with a RRC Connection Setup Confirm in RA Message 5.

When a UE is new in the system the eNodeB has no or very limited information about the channel quality that the UE is experiencing. The channel quality for the uplink is typically characterized by the so called SINR (Signal to Interference and Noise Ratio) which includes both the wanted signal power and the interference power. In the uplink the interference is measured by the eNodeB receiver and is therefore available almost instantaneously, or the interference is known prior to the connection request and the eNodeB performs e.g. pathloss estimation for the particular UE. However, in the downlink the SINR is measured by the UE and explicitly signaled to the eNodeB using a Channel Quality Information (CQI) report. This means that until the eNodeB receives the first CQI report it has no knowledge about the SINR experienced by the UE. Typically, this is solved by using some very robust MCS until the downlink SINR is known. This is a robust solution but it has its disadvantages.

Amongst other things, the RA Message 2 is a very small message and can be transmitted with a low MCS on only a few PRBs with sufficient performance. However, RA Message 4 (RRC Connection Setup) can be significantly larger and using a small MCS for this (as in the example in FIG. 1) can require a lot of PRBs and also require segmentation into a number of separate downlink transmissions. Also, each of these transmissions require a PDCCH message that has to be encoded in a robust way, and will therefore use a large amount of PDCCH CCE:s.

On the other hand, if the initial downlink SINR is too high this will result in too aggressive link adaptation causing many retransmissions and potentially also a failed delivery of the message.

When the UE enter the system and stays active for a longer time, the loss due to this slow initialization is small. But in real networks UEs tend to have quite bursty traffic, where they enter the system, transmit and receive a little bit of data and then go back to idle again. Assuming this traffic model, the above described inefficient link adaptation that UE setups account for can be significant.

Based on the above, there is a need for a way to speed up the initialization of the downlink link adaptation, in particular for UEs with bursty traffic patterns.

SUMMARY

It is an object to provide a solution that obviates the above mentioned problems.

This and other objects are met by embodiments of the proposed technology.

According to a first aspect, there is provided a method for downlink link adaptation in a network node in a communication system, the network node serving a cell and active user equipment within the cell. The method comprises uplink path gain and downlink SINR for at least a subset of active user equipment in the cell, and estimating an initial downlink SINR for new user equipment in the cell, based on an estimated uplink path gain together with a determined statistical measure for the obtained uplink path gain and downlink SINR for the at least a subset of active user equipment in said cell. Finally, the method discloses utilizing the estimated initial downlink SINR for downlink link adaptation for a subsequent transmission to the new user equipment.

According to a second aspect, there is provided a network node configured to serve a cell and active users within the cell wherein the network node is configured to obtain uplink path gain and downlink SINR for at least a subset of active user equipment in the cell, and estimate an initial downlink SINR for new user equipment in the cell, based on an estimated uplink path gain together with a determined statistical measure for the obtained uplink path gain and downlink SINR for the at least a subset of active user equipment in the cell. Further, the network node is configured to utilize the estimated initial downlink SINR for downlink link adaptation for a subsequent transmission to the new user equipment.

According to further aspects there is provided a computer program, a carrier and a network node comprising functional modules.

Embodiments of the proposed technology make it possible to speed up the initial downlink link adaptation.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNodeBs or eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

As mentioned in the background, an issue with current initialization of downlink link adaptation is the necessity to use a robust and non-optimal MCS (Modulation and Coding Scheme) for the initial communication for a new UE entering a cell. The inventors have identified a possibility to reduce the time needed for initialization of downlink link adaptation and reducing the size of the RA Message 4 by enabling a method for estimating the uplink path gain based on collected statistics for already active UE in the cell and utilizing the estimated uplink path gain to estimate a downlink SINR for the RA Message 4 for each new UE entering the cell. This estimate can subsequently be replaced with a proper SINR upon reception of the first CQI for the new UE.

Although the present disclosure mainly deals with random access, it is also applicable to other situations in which a UE connects or reconnects to a cell and the eNodeB does not have recent channel quality data for that particular UE. Another example of such a situation is when the UE becomes active after a longer time of inactivity.

In other words, in order to get a faster initialization of the downlink link adaptation it is proposed to collect statistics about the downlink SINR in the cell. The true downlink SINR will vary depending on where in the cell the UE is located, and this can be approximated by using the uplink path gain as a measure of where in the cell the UE is. The uplink path gain can be measured on the first uplink transmission and can therefore significantly improve the initial estimate of the downlink SINR.

Figure 2:
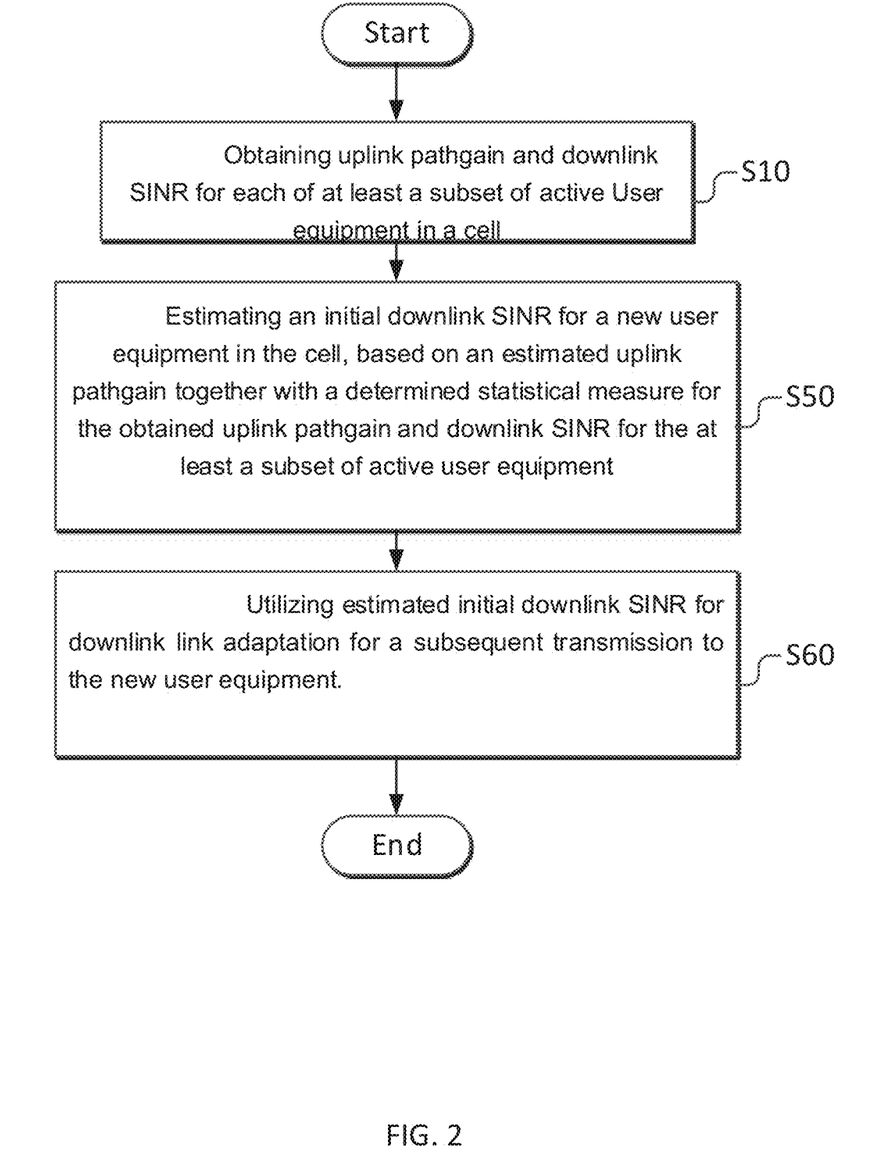
FIG. 2 is an embodiment of a method according to the present disclosure.

With reference to the flow diagram of FIG. 2, embodiments of a method for downlink link adaptation in a network node in a communication system will be described. The network node serves at least one cell and active user equipment within the at least one cell, and at some point in time a new UE enters the cell and tries to connect to the network node. With relation to the active users, the network node continuously obtains, in step S10, uplink path gain and downlink SINR for at least a subset of the active user equipment in the cell. Upon detecting the entry of a new UE into one of the at least one cell the network node estimates, in step S50, an initial downlink SINR for the new user equipment in the cell, based on an estimated uplink path gain for the UE together with a determined statistical measure for the obtained uplink path gain and downlink SINR for the at least a subset of active user equipment in the cell. Subsequently, the network node utilizes, in step S60, the estimated initial downlink SINR for downlink link adaptation for a subsequent transmission to the new user equipment.

The determined statistical measure is a measure indicative of a statistical relation between the downlink SINR and uplink path gain.

Figure 3:
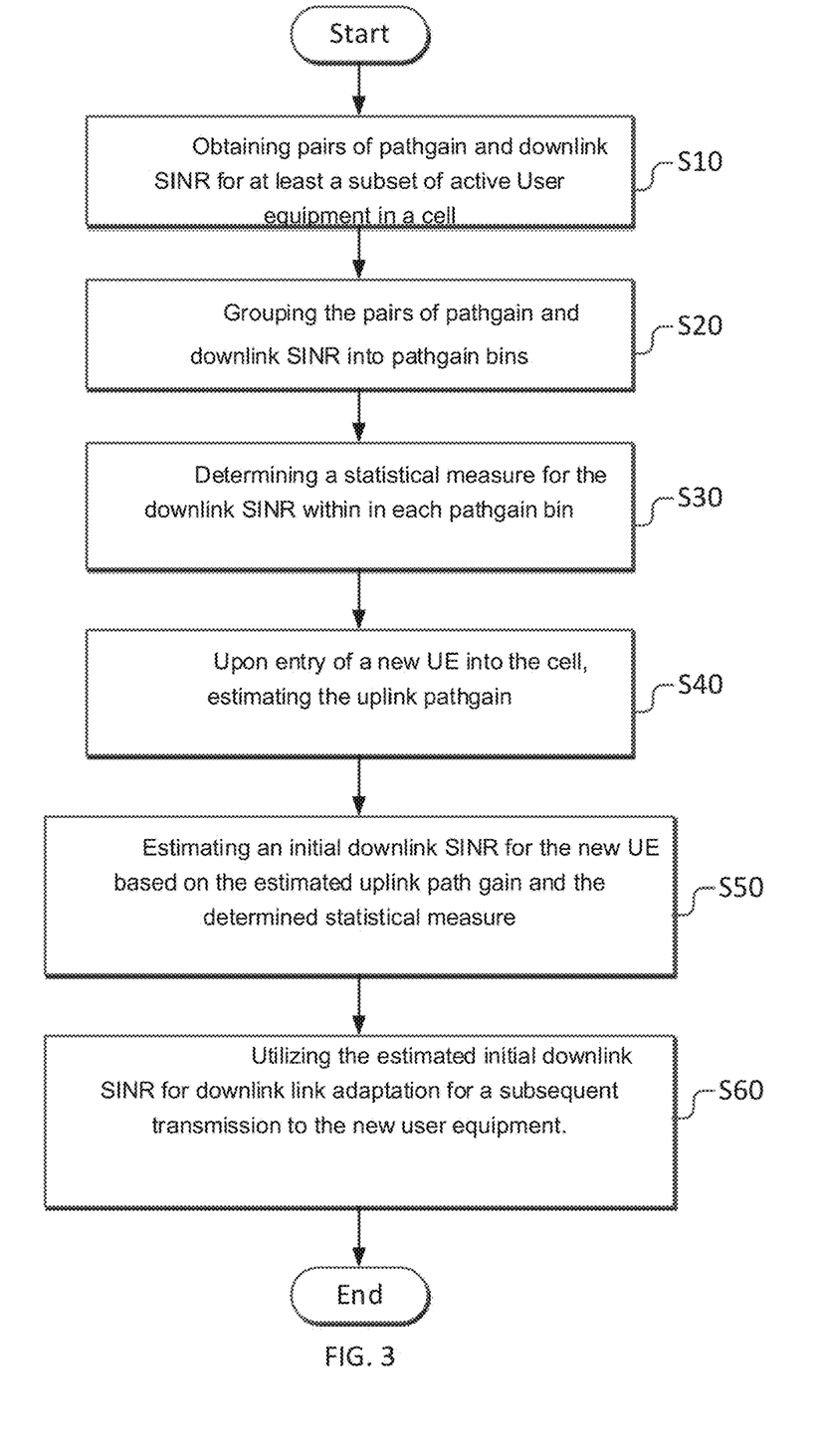
FIG. 3 is a further embodiment of a method according to the present disclosure.

With reference to FIG. 3 as well as FIG. 5, a further embodiment of the method will be described. In order to determine the above mentioned statistical measure, the network node groups, in step S20, the obtained downlink SINR into a plurality of path gain bins based on the obtained uplink path gain, each path gain bin corresponding to a respective path gain interval. In other words, pairs of uplink path gain and downlink SINR for each active user equipment in the at least one cell are sorted into groups or bins based on path gain. As an example, all pairs having a downlink path gain in the interval −140<pathgain<=−135 dB, are sorted into bin 1, all pairs having a downlink path gain in the interval −135<pathgain<=130 are sorted into bin 2 etc. For each such bin, a statistical measure for the downlink SINR in that particular path gain bin is determined in step S30. Subsequently, upon entry of a new user equipment into the cell, the uplink path gain for the new user equipment is estimated in step S40, and finally the estimating step S50 then comprises estimating an initial downlink SINR for the new user equipment based on the estimated uplink path gain and the thus determined statistical measure for a corresponding uplink path gain bin. In other words, using the estimated uplink path gain the network node is able to identify the relevant path gain bin and selecting the determined statistical measure to estimate the initial downlink SINR for the new user equipment.

Subsequently, upon receipt of a first CQI report or similar from the new user equipment, a new downlink SINR is calculated to replace the estimated initial downlink SINR. Also, as the new user equipment becomes active user equipment in the cell, the downlink SINR and uplink path gain for the thus newly activated user is added to the path gain bins and serves as a base for determining the statistical measure for other new user equipment. Thereby, the addition of each new user equipment improves the accuracy of the statistical measure.

Determining the statistical measure can comprise calculating a suitable percentile e.g. the 5%-ile or 10%-ile or other downlink SINR for each path gain bin, or calculating the average downlink SINR for each path gain bin or utilizing some other statistical measure. An embodiment illustrating this is shown in the diagram of FIG. 4.

Figure 4:
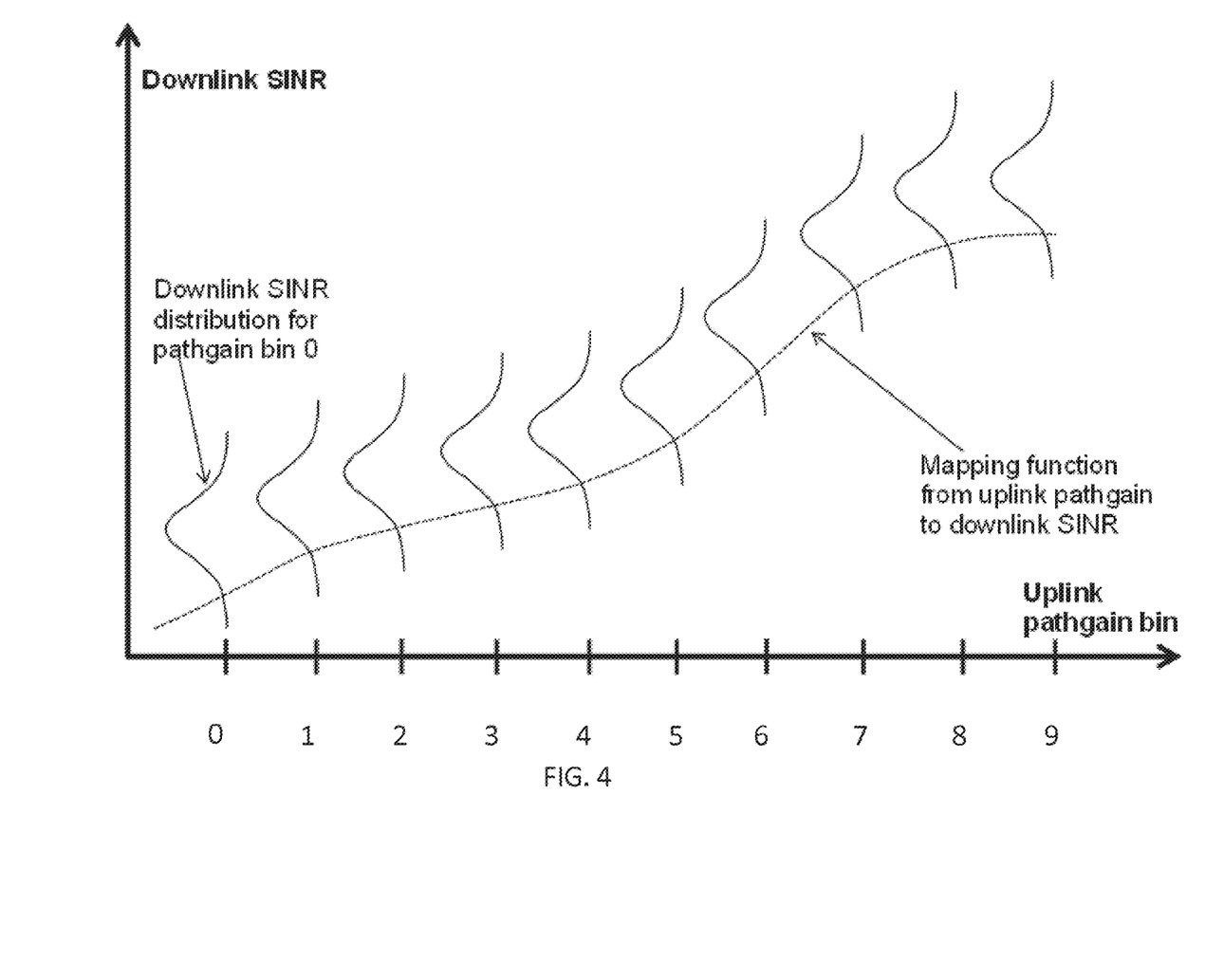
FIG. 4 is a diagram illustrating the teachings of the current disclosure.

In the example in FIG. 4 the distribution of the SINR within each path gain bin (numbered 0-9) is illustrated, as well as an example mapping function between uplink path gain and downlink SINR.

Figure 5:
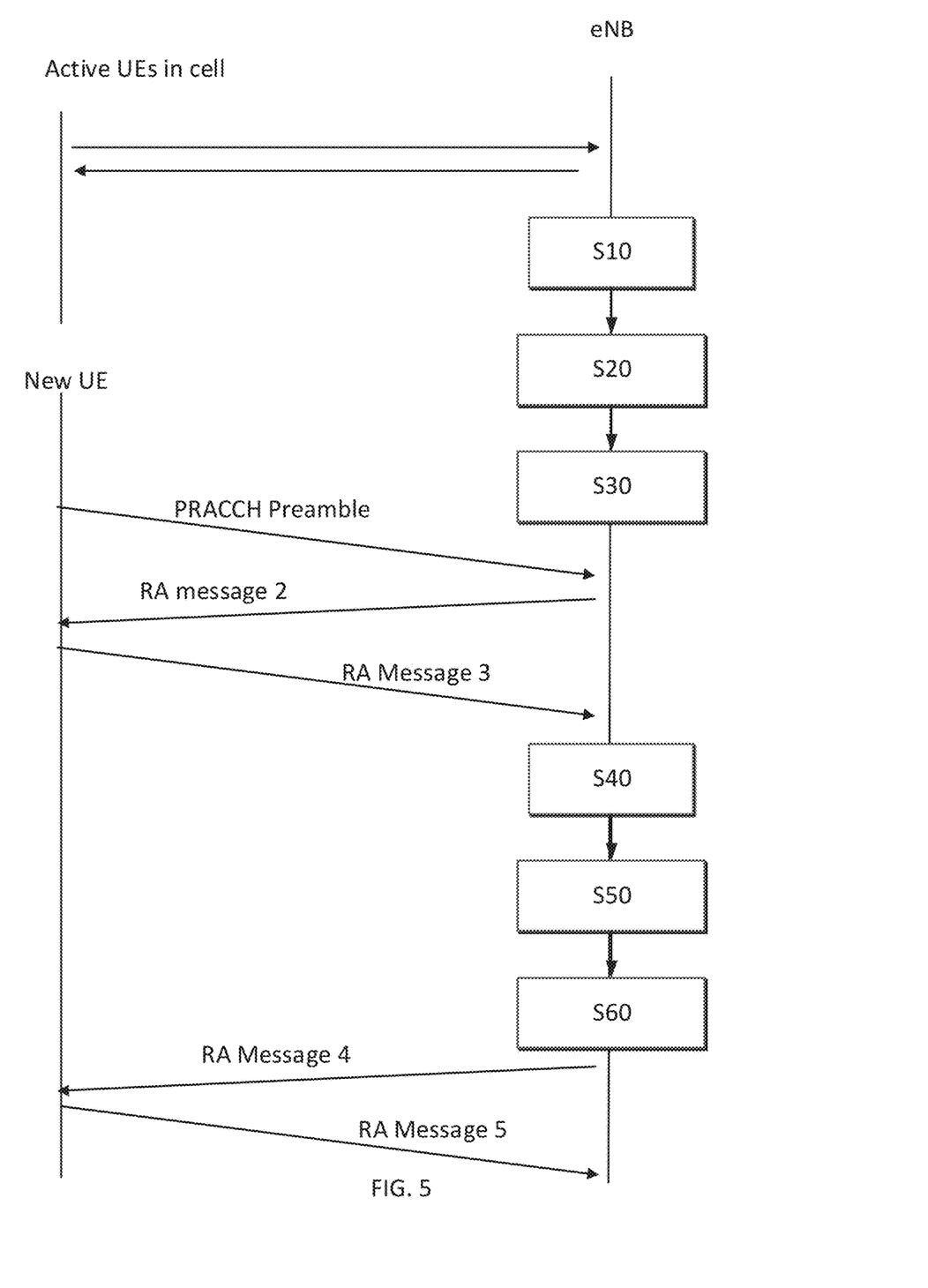
FIG. 5 is an illustration of a method according to the present disclosure.

FIG. 5 is a combined flow chart and signaling diagram to further illustrate the benefits of the disclosed technology.

Below follows a particular example embodiment of the above described method. The method is typically performed by the network node e.g. eNB, or an arrangement within or in communication with the eNB.

1) Collect pairs of pathgain and downlink SINR for active users in the cell. For example, when a CQI report is received the uplink pathgain can be calculated and the downlink SINR calculated from the received CQI is stored in a bin corresponding to the uplink pathgain.
2) Calculate suitable statistics for the downlink SINR in each pathgain bin. For example the 10%-ile downlink SINR can be calculated for each pathgain bin as illustrated in FIG. 4. Another way would be to instead of the 10%-ile calculate the average downlink SINR.
3) When a new UE enters the system the uplink pathgain is estimated. This could be done based on an earlier uplink transmission, i.e. the PRACH preamble or the RA Message 3 transmission. The downlink SINR statistics from step 2 (e.g. the 10%-ile) for this uplink pathgain can then be used to make an initial guess for the downlink SINR used for link adaptation for RA Message 4
4) When the first CQI report is received this is used to calculate a new SINR that overrides the value estimated from uplink pathgain It should be noted that since the disclosed method is based on statistics over all UEs in a cell, there can be UEs that for a certain uplink path loss has significantly worse downlink SINR. In this case the downlink SINR estimated by the disclosed method will be too aggressive, thus leading to a significant number of HARQ retransmissions and potentially also loss of the entire message. To improve robustness, the algorithm can fall back to a very robust downlink SINR after a certain number of retransmissions, for example when the maximum number of HARQ retransmissions for the message has been reached.

The disclosed method for estimating an initial downlink SINR can be used for initial UE setup, i.e. when a new UE enters the system, but also in case of an incoming handover or when acquiring uplink synchronization.

According to a couple of particular examples, taking into account the knowledge or lack of knowledge about power headroom, the path loss or path gain can be determined as described below.

If the power headroom is known, then the UE TX power [dBm] can be determined according to $$Ptx=Pmax-Pheadroom$$

If the power headroom is not known, then the UE TX power [dBm] can be determined according to $$Ptx=Pmax$$

Based on either of the two expressions for the UE TX power, the path loss [dBm] can then be calculated according to $$Pathloss=Ptx-Prx,$$

where Prx is the received power for RA Message 3 or a PRACH preamble.

Another embodiment may include saving and utilizing statistics of UEs that have been connected to the eNodeB at previous instances. This would include saving information about UEs that have been previously connected to the eNodeB, and reusing that information when a particular UE re-connects to the eNodeB. As an example, the likelihood that the UE is in the same location as in the previous connected time instance is approximately inversely proportional to the elapsed time since the last connect. A possible improvement to this may be to estimate the speed of the UE during its previous connect.

According to a further embodiment, the UE has been associated with the eNodeB previously and the eNodeB has previous information about the UE. This information can potentially be reused upon reattachment of the UE to the eNodeB. One example might be the pathloss for the UE, which then can be used instead of the calculated pathloss above.

Figure 6:
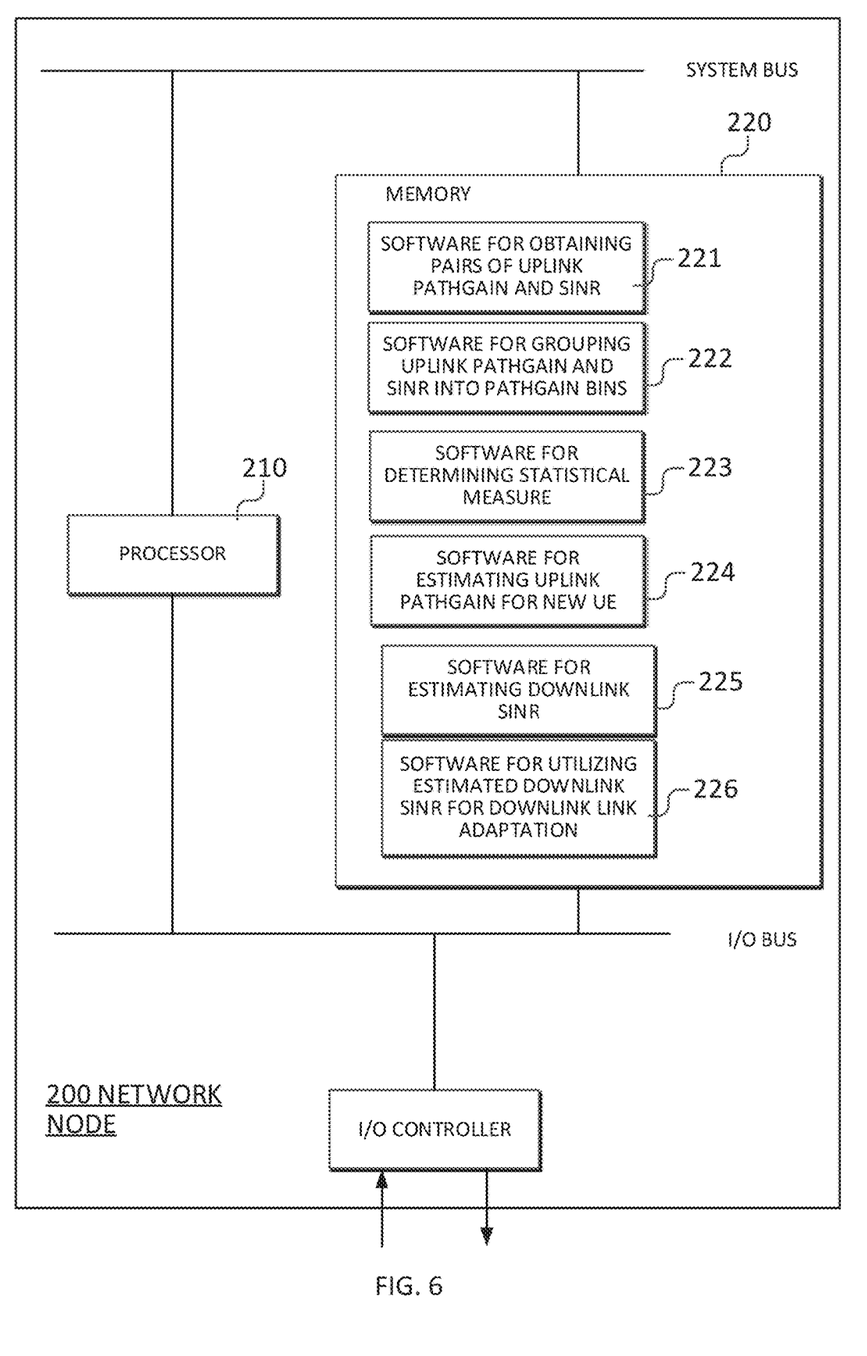
FIG. 6 is a further embodiment of a node of the current disclosure.

The proposed technology provides an arrangement or a network node 200 configured to serve a cell and active user equipment within the cell. The arrangement or network node 200 is configured to perform the embodiments of the method as described previously. In particular, the network node 200 is configured to obtain uplink path gain and downlink SINR for at least a subset of active user equipment in the cell, and estimate an initial downlink SINR for a new user equipment in the cell, based on an estimated uplink path gain together with a determined statistical measure for the obtained uplink path gain and downlink SINR for the at least a subset of active user equipment in the cell. Further, the network node 200 is configured to utilize the estimated initial downlink SINR for downlink link adaptation for a subsequent transmission to the new user equipment.

Further, the network node 200 is configured to calculate and replace the estimated initial downlink SINR with a new downlink SINR upon receipt of a first CQI report or similar from the new user equipment.

If the initial downlink SINR is too aggressive, thus causing too large a number of HARQ retransmissions. For example, if a number of HARQ retransmissions exceed a predetermined number, the network node 200, according to a further embodiment, is configured to replace the initially estimated downlink SINR with a predetermined or selected SINR.

According to a further embodiment, the arrangement or network node 200 is further configured to obtain uplink path gain and downlink SINR for each active user equipment in the cell, and group the obtained downlink SINR into a plurality of path gain bins based on the obtained uplink path gain, each path gain bin corresponding to a respective path gain interval. Further, the network node 200 is configured to determine a statistical measure for the downlink SINR in each path gain bin, the statistical measure representing a statistical distribution of the downlink SINR within each path gain bin. Each path gain bin corresponding to pairs of uplink path gain and downlink SINR sorted into groups of path gain intervals.

Further, upon entry of new user equipment into the cell, the network node 200 is configured to estimate the uplink path gain for the new user equipment, and to estimate an initial downlink SINR for the new user equipment based on the estimated uplink path gain and the determined statistical measure for a corresponding uplink path gain bin. Finally, the network node 200 is configured to utilize the estimated initial downlink SINR for downlink link adaptation for a subsequent transmission to said new user equipment.

Optionally, the wireless device, UE, network node may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 6 is a schematic block diagram illustrating an example of a network node 200 comprising a processor 210 and an associated memory 220.

In a particular example, the arrangement or network node 200 comprises a processor 210 and a memory 220, the memory 220 comprising instructions executable by the processor 210, whereby the network node 200 is operative to obtain uplink path gain and downlink SINR for each active user equipment in the cell served by the network node 200, and to group the obtained downlink SINR into a plurality of path gain bins based on the obtained uplink path gain, each path gain bin corresponding to a respective path gain interval. Further the network node 200 is operative to determine a statistical measure for the downlink SINR in each path gain bin, and upon entry of new user equipment into the cell, estimate the uplink path gain for the new user equipment. Subsequently, the network node 200 is operative to estimate an initial downlink SINR for the new user equipment based on the estimated uplink path gain and the determined statistical measure for a corresponding uplink path gain bin, and to utilize the estimated initial downlink SINR for downlink link adaptation for a subsequent transmission to the new user equipment.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to perform the functions as described above.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 6.

FIG. 6 is a schematic block diagram illustrating an example of a network node comprising a group of function modules. Consequently, the network node 200 includes an obtaining module 221 for obtaining uplink path gain and downlink SINR for each active user equipment in the cell, a grouping module 222 for grouping the obtained downlink SINR into a plurality of path gain bins based on the obtained uplink path gain, each path gain bin corresponding to a respective path gain interval. Further the network node 200 includes a determining module 223 for determining a statistical measure for the downlink SINR in each path gain bin, and an estimating module 224 for, upon entry of a new user equipment into the cell, estimating the uplink path gain for the new user equipment. In addition, the network node 200 includes an estimating module 225 for estimating an initial downlink SINR for the new user equipment based on the estimated uplink path gain and the determined statistical measure for a corresponding uplink path gain bin, and a utilizing module 226 for utilizing said estimated initial downlink SINR for downlink link adaptation for a subsequent transmission to the new user equipment.

In summary the present disclosure present using path loss estimates from a RA Message 3 reception together with long term correlation between uplink path gain and CQI to estimate CQI/SINR for initial downlink transmissions. Thereby, the initialization of downlink link adaptation is performed faster than in prior art.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for downlink link adaptation in a network node in a communication system, said network node serving a cell and active user equipment within said cell, wherein said method comprises:
   obtaining uplink path gain and downlink Signal to Interference and Noise Ratio (SINR) for at least a subset of active user equipment in said cell;
   estimating an initial downlink SINR for a new user equipment in said cell, based on an estimated uplink path gain together with a determined statistical measure for said obtained uplink path gain and downlink SINR for said at least a subset of active user equipment in said cell; and
   utilizing said estimated initial downlink SINR for downlink link adaptation for a subsequent transmission to said new user equipment.

2. The method according to claim 1, wherein said method further comprises:
   grouping said obtained downlink SINR into a plurality of path gain bins based on said obtained uplink path gain, each path gain bin corresponding to a respective path gain interval;
   determining a statistical measure for the downlink SINR in each path gain bin; and
   upon entry of the new user equipment into the cell, estimating the uplink path gain for said new user equipment,
   wherein estimating comprises estimating an initial downlink SINR for said new user equipment based on said estimated uplink path gain and said determined statistical measure for a corresponding uplink path gain bin.

3. The method according to claim 2, wherein determining the statistical measure comprises calculating a 10 percentile downlink SINR for each path gain bin.

4. The method according to claim 2, wherein determining the statistical measure comprises calculating an average downlink SINR for each path gain bin.

5. The method according to claim 1, wherein upon receipt of a Channel Quality Information (CQI) report from said new user equipment, calculating new downlink SINR to replace said estimated initial downlink SINR.

6. A computer program comprising instructions, which when executed by at least one processor, cause the at least one processor to perform operations according to claim 1.

7. A network node configured to serve a cell and active users within said cell, wherein said network node is configured to:
   obtain uplink path gain and downlink Signal to Interference and Noise Ratio (SINR) for at least a subset of active user equipment in said cell;
   estimate an initial downlink SINR for a new user equipment in said cell, based on an estimated uplink path gain together with a determined statistical measure for said obtained uplink path gain and downlink SINR for said at least a subset of active user equipment in said cell; and
   utilize said estimated initial downlink SINR for downlink link adaptation for a subsequent transmission to said new user equipment.

8. The network node according to claim 7, wherein said network node is further configured to:
   obtain uplink path gain and downlink SINR for each active user equipment in said cell;

group said obtained downlink SINR into a plurality of path gain bins based on said obtained uplink path gain, each path gain bin corresponding to a respective path gain interval;

determine a statistical measure for the downlink SINR in each path gain bin;

upon entry of the new user equipment into the cell, estimate the uplink path gain for said new user equipment;

estimate an initial downlink SINR for said new user equipment based on said estimated uplink path gain and said determined statistical measure for a corresponding uplink path gain bin; and utilize said estimated initial downlink SINR for downlink link adaptation for a subsequent transmission to said new user equipment.

9. The network node of claim 7, wherein the network node comprises a processor and a memory, said memory comprising instructions executable by the processor, whereby the processor is operative to:

obtain uplink path gain and downlink SINR for each active user equipment in said cell;

group said obtained downlink SINR into a plurality of path gain bins based on said obtained uplink path gain, each path gain bin corresponding to a respective path gain interval;

determine a statistical measure for the downlink SINR in each path gain bin;

upon entry of the new user equipment into the cell, estimate the uplink path gain for said new user equipment;

estimate an initial downlink SINR for said new user equipment based on said estimated uplink path gain and said determined statistical measure for a corresponding uplink path gain bin; and utilize said estimated initial downlink SINR for downlink link adaptation for a subsequent transmission to said new user equipment.

10. A network node for serving a cell and active users within said cell wherein said network node comprises a processor and a memory, the memory comprising instructions stored thereon which when executed by the processor cause the processor to:

obtain uplink path gain and downlink Signal to Interference and Noise Ratio (SINR) for each active user equipment in said cell;

group said obtained downlink SINR into a plurality of path gain bins based on said obtained uplink path gain, each path gain bin corresponding to a respective path gain interval;

determine a statistical measure for the downlink SINR in each path gain bin;

upon entry of a new user equipment into the cell, estimate the uplink path gain for said new user equipment;

estimate an initial downlink SINR for said new user equipment based on said estimated uplink path gain and said determined statistical measure for a corresponding uplink path gain bin and downlink SINR for said at least a subset of active user equipment in said cell; and utilize said estimated initial downlink SINR for downlink link adaptation for a subsequent transmission to said new user equipment.

* * * * *